(12) United States Patent
Goan

(10) Patent No.: US 7,399,430 B2
(45) Date of Patent: Jul. 15, 2008

(54) METHOD FOR MANUFACTURING PHOSPHOR, PHOSPHOR AND PLASMA DISPLAY PANEL

(75) Inventor: Kazuyoshi Goan, Sagamihara (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 376 days.

(21) Appl. No.: 11/206,145

(22) Filed: Aug. 18, 2005

(65) Prior Publication Data

US 2006/0043338 A1 Mar. 2, 2006

(30) Foreign Application Priority Data

Aug. 24, 2004 (JP) ............................. 2004-243831

(51) Int. Cl.
*C09K 11/08* (2006.01)
*H01J 9/227* (2006.01)

(52) U.S. Cl. ................... 252/301.4 R; 216/96; 216/99; 216/101; 216/108; 264/21; 252/301.4 S; 252/301.4 F; 252/301.4 P; 252/301.4 H; 252/301.6 R; 252/301.5; 252/301.6 S; 252/301.6 F; 252/301.6 P

(58) Field of Classification Search ...... 252/301.4 R–301.6 P; 264/21; 216/96, 99, 101, 108
See application file for complete search history.

(56) References Cited

U.S. PATENT DOCUMENTS

| | | | | |
|---|---|---|---|---|
| 2,164,533 A | * | 7/1939 | Leverenz | 252/301.6 R |
| 3,597,366 A | * | 8/1971 | Graff et al. | 252/301.4 P |
| 6,454,967 B1 | | 9/2002 | Im et al. | |

FOREIGN PATENT DOCUMENTS

| | | |
|---|---|---|
| JP | 2000-226577 | 8/2000 |
| JP | 2001-172622 | 6/2001 |
| JP | 2003-292950 | 10/2003 |

OTHER PUBLICATIONS

Derwent Abstract of JP-2000-226577.
Derwent Abstract of JP-2003-292950.

* cited by examiner

*Primary Examiner*—C. Melissa Koslow
(74) *Attorney, Agent, or Firm*—Finnegan, Henderson, Farabow, Garrett & Dunner, L.L.P.

(57) ABSTRACT

It is an object of the present invention to control damage of a phosphor caused by an etching solution. Disclosed is a method of manufacturing a phosphor having the steps of: (a) crushing phosphor particles via a crushing treatment process, and (b) surface-treating phosphor particles dispersed in a solvent by adding an etching solution via a surface treatment process, wherein an adding speed of the etching solution is in a range of $1.2 \times 10^{-16}$-$7.0 \times 10^{-15}$ mol/min. per 1 m² of specific surface area of the phosphor particles.

6 Claims, 5 Drawing Sheets

METHOD FOR MANUFACTURING PHOSPHOR, PHOSPHOR AND PLASMA DISPLAY PANEL

This application claims priority from Japanese Patent Application No. Jp2004-243831 filed on Aug. 24, 2004, which is incorporated hereinto by reference.

TECHNICAL FIELD

The present invention relates to a method for manufacturing a phosphor, a phosphor and a plasma display panel, and in particular, to the method wherein phosphors dispersed in a solvent are subjected to surface treatment by means of oxygen, a phosphor and a plasma display panel both resulting from the aforementioned method.

BACKGROUND

As a display device employing a novel image display method replacing CRT (Cathode Ray Tube), there have been recently developed a liquid crystal display using a liquid crystal panel (LCD: Liquid Crystal Display), an EL display using a phenomenon of electro luminescence (EL: Electro Luminescence) and a plasma display using a plasma display panel (hereinafter referred to as PDP: Plasma Display Panel).

In the plasma display among those stated above, it is possible to achieve slim lightweight panels, simplification of the structure and large screens, and it is possible to observe a sharp image at an angle in a wide range upward and downward and on all sides, because a visible range, the so-called view angle can cover 160° or more both in the horizontal and vertical directions, when compared with a liquid crystal panel. Further, the plasma display is of an image display system with a fixed pixel by means of a dot matrix printer, and therefore, out of color registration and a distortion of an image area are controlled, and an image with high image quality can be depicted even when it is a large image area.

The PDP used for the plasma display is provided with a large number of discharge cells each being formed by two glass base boards provided with electrodes and by a partition provided between the base boards, and a phosphor layer on which a phosphor is coated is formed inside each discharge cell. The PDP constructed in this way is arranged so that vacuum ultraviolet (hereinafter referred to as VUV: Vacuum Ultraviolet) caused by discharge gas filled in a discharge cell may be generated when impressing voltage between electrodes to discharge the discharge cell selectively, and thereby, a phosphor may be excited to emit visible light.

As a general manufacturing method for the phosphor stated above, there are two ways including a solid phase synthesis wherein compounds containing an element constituting a phosphor matrix and compounds containing an activating element, each being in a prescribed amount are mixed, and then, are baked, and a liquid phase synthesis wherein a phosphor material solution containing an element constituting a phosphor matrix and a phosphor material solution containing an element of activating agents are mixed, and baking is carried out after sediment of precursors of the phosphors thus obtained is subjected to liquid-solid separation.

For realizing images which are more clear and are of higher image quality, PDP is highly miniaturized recently, and a phosphor which is small in size and has high light-emission intensity is required by the highly miniaturized PDP. However, a phosphor particle obtained through a solid phase synthesis is large in size, and has a problem that emission efficiency and light-emission intensity are lowered as its particle size turns out to be smaller.

On the other hand, there has been developed a method to miniaturize phosphor particles by conducting a crushing treatment process after manufacturing a phosphor by and a liquid phase synthesis, and thereby to improve light-emission intensity by receiving VUV efficiently. However, there is also caused a problem that the light-emission intensity is lowered, because a surface layer of the phosphor is damaged by the crushing treatment process, and distribution of particle sizes is broadened.

There is also caused another problem that impurities such as nonreacted substances and by-products adhere to the surface of phosphor particle after baking, to absorb VUV generated by electric discharge, resulting in a decline of light-emission intensity.

With the foregoing as a background, there have been developed a phosphor capable of improving emission efficiency of the phosphor, and a manufacturing method of the phosphor wherein impurities such as nonreacted substances and by-products adhering to the surface layer of damaged phosphor particles and to the surface of the phosphor particle are removed by conducting chemical processing by etching solutions such as nitric acid or hydrochloric acid on the phosphor surface, after the phosphor is synthesized by the liquid phase synthesis (for example, Patent Documents 1, 2 and 3).

(Patent Documents 1) TOKKAI No. 2000-226577
(Patent Documents 2) TOKKAI No. 2001-172622
(Patent Documents 3) TOKKAI No. 2003-292950

SUMMARY

In the case of the method for manufacturing a phosphor mentioned above, when a phosphor is dipped in an etching solution, the etching solution encroaches a phosphor main body which is further irradiated with VUV, thus, the phosphor main body is damaged, resulting in a problem that the light-emission intensity is declined.

The invention has been achieved in view of the aforesaid point, and its object is to provide the following three items including a method for manufacturing a phosphor wherein damage of a phosphor main body caused by an etching solution can be controlled, a phosphor and a plasma display panel both resulting from the aforementioned method.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

Figure 1:
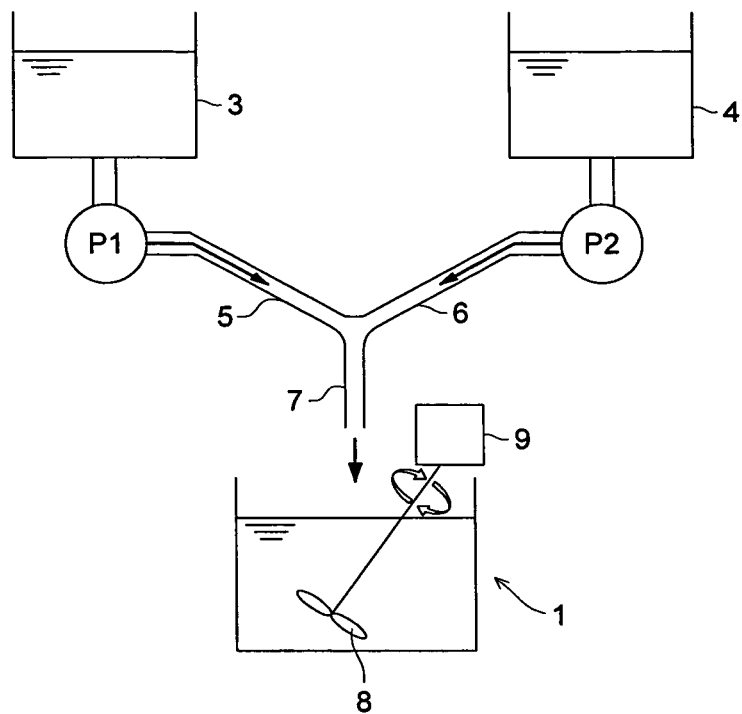
FIG. 1 is a schematic diagram showing a Y-shaped reaction apparatus.

BRIEF DESCRIPTION OF THE PREFERRED EMBODIMENTS (Structure 1) to solve the problems above, disclosed is a method for manufacturing a phosphor having the steps of: (a) crushing phosphor particles via a crushing treatment process, and (b) surface-treating phosphor particles dispersed in a solvent by adding an etching solution via a surface treatment process, wherein an adding speed of the etching solution is in a range of $1.2 \times 10^{-16}$-$7.0 \times 10^{-15}$ mol/min. per 1 m$^2$ of specific surface area of the phosphor particles.

Since an adding speed of the etching solution is in a range of $1.2 \times 10^{-16}$-$7.0 \times 10^{-15}$ mol/min. per 1 m$^2$ of specific surface area of the phosphor particle in the invention described in Structure 1, it is possible to mix a solvent in which phosphor particles are dispersed and the etching solution evenly, by controlling the adding speed of the etching solution.

(Structure 2) The method for manufacturing a phosphor of Structure 1, wherein an added amount of the etching solution is in a range of 0.001-0.005 mol per 1 g of a phosphor.

Since an added amount of the etching solution is in a range of 0.001-0.005 mol per 1 g of phosphor in the invention described in Structure 2, it is possible to mix a solvent in which phosphor particles are dispersed and the etching solution more evenly, by controlling an added amount of the etching solution.

(Structure 3) The method for manufacturing a phosphor of Structure 1 or 2, wherein a temperature during addition of the etching solution is in a range of 20-60° C.

Since a temperature for adding the etching solution is in a range of 20-60° C. in the invention described in Structure 3, it is possible to mix a solvent in which phosphor particles are dispersed and the etching solution more evenly, by controlling a temperature for adding the etching solution.

(Structure 4) The method for manufacturing a phosphor of any one of Structures 1-3, wherein the etching solution is added to a solvent in which the phosphor particles are dispersed.

Since the etching solution is added in a solvent in which the phosphor particles are dispersed in the invention described in Structure 4, it is possible to mix a solvent in which phosphor particles are dispersed and the etching solution more evenly, by changing a position of adding the etching solution.

(Structure 5) The method for manufacturing a phosphor of Structures 1 further comprises, after the surface treatment, (c) a washing process, and (d) a drying process.

(Structure 6) The method for manufacturing a phosphor of any one of Structures 1-4, wherein employed is an apparatus that is constructed so that a solvent in which the phosphor particles supplied via a first flow path are dispersed and the etching solution supplied via a second flow path are simultaneously discharged directly into the inside of liquid.

Since there is employed an apparatus that is constructed so that a solvent in which the phosphor particles supplied through the first flow path are dispersed and the etching solution supplied through the second flow path are simultaneously discharged directly into the inside of liquid, in the invention described in Structure 6, it is possible to mix a solvent in which phosphor particles are dispersed and the etching solution more evenly, by changing a form of the apparatus to be used.

(Structure 7) The method for manufacturing a phosphor of any one of Structures 1-4, wherein employed is an apparatus that is constructed so that the solvent in which the phosphor particles supplied via the first flow path are dispersed and the etching solution supplied via the second flow path are brought into contact with each other and are mixed, and then, are continuously supplied to a third flow path, and the solutions after mixing are supplied at a flow speed that is faster than that of the solvent in which the phosphor particles are dispersed and that of the etching solution, and then, are continuously discharged from the third flow path.

Since the invention described in Structure 7 employs an apparatus that is constructed so that at least a solvent in which the phosphor particles supplied via the first flow path are dispersed and the etching solution supplied via the second flow path are brought into contact with each other and are mixed, and then, are continuously supplied to the third flow path, and the solutions after mixing are supplied at a flow speed that is faster than that of the solvent in which the phosphor particles are dispersed and that of the etching solution, and then, are continuously discharged from the third flow path, it is possible to mix a solvent in which phosphor particles are dispersed and the etching solution more evenly, by changing a form of the apparatus to be used.

(Structure 8) The method for manufacturing a phosphor of any one of Structures 1-7, wherein the surface treatment process is carried out, following the crushing treatment process.

Since the surface treatment process is carried out, following the crushing treatment process, in the invention described in Structure 8, impurities such as nonreacted substances and by-products adhering to the surface of phosphor particle, and the surface layer damaged in the course of a crushing treatment process can be removed simultaneously.

(Structure 9) A phosphor manufactured by the method of any one of Structures 1-8.

The invention described in Structure 9 makes it possible to prevent damage of a phosphor main body caused by an etching solution, because it is manufactured by the method described in any one of Structures 1-8.

(Structure 10) A plasma display possessing a discharge cell containing the phosphor of Structure 9.

The invention described in Structure 10 makes it possible to improve the light-emission intensity of the discharge cell, because the phosphor described in Structure 9 is contained in the phosphor layer of the discharge cell.

While the preferred embodiments of the present invention have been described using specific terms, such description is for illustrative purposes only, and it is to be understood that changes and variations may be made without departing from the spirit or scope of the appended claims.

DETAILED DESCRIPTION OF INVENTION

Preferred embodiments for practicing the invention will be explained as follows, referring to the drawings, in which, however, the embodiments which will be explained as follows include various limitations which are technically preferable for practicing the invention, and a scope of the invention is not limited to the following embodiments and illustrations.

Details of a method for manufacturing a phosphor, a phosphor and a plasma display panel, all relating to the invention will be explained respectively as follows, referring to FIGS. 1-7.

In the beginning, a phosphor relating to the invention will be explained.

The phosphor relating to the invention is a vacuum ultraviolet exciting phosphor (hereinafter referred to as phosphor) which is easily affected by light-emission intensity especially due to its composition in the vicinity of a surface layer, and a surface of each phosphor particle is subjected to etching processing. Owing to this, impurities adhering to the surface and surface layers of phosphor particles (hereinafter referred to as impurities) are removed, whereby, VUV is received efficiently, and light-emission intensity is improved. Specifically, phosphor particles subjected to etching processing are manufactured by a liquid phase synthesis, and it is preferable that an average particle size is in a range of 20 nm -5 μm, and a particle size distribution is within ±50% of an average particle size.

The impurities adhering to the surface mean a trace amount of substances other than nonreacted substances remaining without reacting in the course of baking process which will be explained later and phosphor compositions resulted from the baking.

Further, the average particle size means an average value obtained by measuring particle sizes of 300 phosphor particles by the use of an electron microscope (for example, S-900 produced by Hitachi, Ltd.). The particle size mentioned here means a length of an edge of a phosphor particle, when a phosphor particle is a normal crystal such as a cube or a octahedron. When a phosphor particle is not a normal crystal, for example, when a phosphor particle is spherical, bar-shaped or flat-plate-shaped, the particle size means a diameter of a sphere whose volume is the same as that of the phosphor particle.

Incidentally, the etching processing is carried out to remove impurities on the surface of a phosphor particle, and it may be arranged either to remove only impurities adhering to the surface or to remove a surface layer having low light-emission efficiency on the phosphor particle together with impurities. The surface layer having low light-emission efficiency on the phosphor particle mentioned here means a range in terms of a depth ranging from about 0% to 20% of a diameter from the surface, and the preferable range is not less than 1.5 mol % and less than 20 mol %.

Specific examples of compounds of inorganic phosphors used as the phosphor of the invention are shown below.

(Blue Light Emitting Phosphor Compounds)
(BL-1):$Sr_2P_2O_7:Sn^{4+}$
(BL-2):$Sr_4Al_{14}O_{25}:Eu^{2+}$
(BL-3):$BaMgAl_{10}O_{17}:Eu^{2+}$
(BL-4):$SrGa_2S_4:Ce^{3+}$
(BL-5):$CaGa_2S_4:Ce^{3+}$
(BL-6):$(Ba,Sr)(Mg,Mn)Al_{10}O_{17}:Eu^{2+}$
(BL-7):$(Sr,Ca,Ba,Mg)_{10}(PO_4)6Cl_2:Eu^{2+}$
(BL-8):$ZnS:Ag$
(BL-9):$CaWO_4$
(BL-10):$Y_2SiO_5:Ce$
(BL-11):$ZnS:Ag,Ga,Cl$
(BL-12):$Ca_2B_5O_9Cl:Eu^{2+}$
(BL-13):$BaMgAl_{14}O_{23}:Eu^{2+}$
(BL-14):$BaMgAl_{10}O_{17}:Eu^{2+}, Tb^{3+}, Sm^{2+}$
(BL-15):$BaMgAl_{14}O_{23}:Sm^{2+}$
(BL-16):$Ba_2Mg_2Al_{12}O_{22}:Eu^{2+}$
(BL-17):$Ba_2Mg_4Al_8O_{18}:Eu^{2+}$
(BL-18):$Ba_3Mg_5Al_{18}O_{35}:Eu^{2+}$
(BL-19):$(Ba,Sr,Ca)(Mg,Zn,Mn)Al_{10}O_{17}:Eu^{2+}$ (Green Light Emitting Phosphor Compounds)
(GL-1):$(Ba,Mg)Al_{16}O_{27}:Eu^{2+},Mn^{2+}$
(GL-2):$Sr_4Al_{14}O_{25}:Eu^{2+}$
(GL-3):$(Sr,Ba)Al_2Si_2O_8:Eu^{2+}$
(GL-4):$(Ba,Mg)_2SiO_4:Eu^{2+}$
(GL-5):$Y_2SiO_5:Ce^{3+},Tb^{3+}$
(GL-6):$Sr_2P_2O_7-Sr_2B_2O_5: Eu^{2+}$
(GL-7):$(Ba,Ca,Mg)_5(PO_4)_3Cl:Eu^{2+}$
(GL-8):$Sr_2Si_3O_8\text{-}2SrCl_2:Eu^{2+}$
(GL-9):$Zr_2SiO_4,MgAl_{11}O_{19}:Ce^{3+},Tb^{3+}$
(GL-10):$Ba_2SiO_4:Eu^{2+}$
(GL-11):$ZnS:Cu,Al$
(GL-12):$(Zn,Cd)S:Cu,Al$
(GL-13):$ZnS:Cu,Au,Al$
(GL-14):$Zn_2SiO_4:Mn^{2+}$
(GL-15):$ZnS:Ag,Cu$
(GL-16):$(Zn,Cd)S:Cu$
(GL-17):$ZnS:Cu$
(GL-18):$Gd_2O_2S:Tb$
(GL-19):$La_2O_2S:Tb$
(GL-20):$Y_2SiO_5:Ce,Tb$
(GL-21):$Zn_2GeO_4:Mn$
(GL-22):$CeMgAl_{11}O_{19}:Tb$
(GL-23):$SrGa_2S_4:Eu^{2+}$
(GL-24):$ZnS:Cu,Co$
(GL-25):$MgO.nB_2O_3:Ce,Tb$
(GL-26):$LaOBr:Tb,Tm$
(GL-27):$La_2O_2S:Tb$
(GL-28):$SrGa_2S_4:Eu^{2+},Tb^{3+},Sm^{2+}$ (Red Light Emitting Phosphor Compounds)
(RL-1):$Y_2O_2S:Eu^{3+}$
(RL-2):$(Ba,Mg)_2SiO_4:Eu^{3+}$
(RL-3):$Ca_2Y_8(SiO_4)_6O_2:Eu^{3+}$
(RL-4):$LiY_9(SiO_4)_6O_2:Eu^{3+}$
(RL-5):$(Ba,Mg)Al_{16}O_{27}:Eu^{3+}$
(RL-6):$(Ba,Ca,Mg)_5(PO_4)_3Cl:Eu^{3+}$
(RL-7):$YVO_4:Eu^{3+}$
(RL-8):$YVO_4:Eu^{3+},Bi^{3+}$
(RL-9):$CaS:Eu^{3+}$
(RL-10):$Y_2O_3:Eu^{3+}$
(RL-11):$3.5MgO,0.5MgF_2GeO_2:Mn$
(RL-12):$YAlO_3:Eu^{3+}$
(RL-13):$YBO_3:Eu^{3+}$
(RL-14):$(Y,Gd)BO_3:Eu^{3+}$ Incidentally, it is preferable to apply (GL-14) $Zn_2SiO_4:Mn^{2+}$ to the phosphor relating to the invention.

Next, a method of manufacturing the aforesaid phosphor will be explained.

The method for manufacturing a phosphor relating to the invention has therein a step of forming a precursor that forms a precursor of a phosphor, a baking step to bake the precursor obtained by the step of forming a precursor and thereby to obtain a phosphor particle, a dispersion processing step to apply dispersion processing to the phosphor particle obtained by the baking step and thereby to make the particle size small and a surface treatment step to apply etching processing on a surface of the phosphor particle obtained by the dispersion processing step and thereby to remove impurities.

In the step of forming a precursor, a precursor representing an intermediate product of the phosphor is synthesized by a liquid phase synthesis, and in the succeeding baking step, the precursor is baked at the prescribed temperature, thus, a phosphor particle is obtained.

The liquid phase synthesis is a method to synthesize a precursor under the presence of a liquid, or in a liquid, and it is also called a liquid phase synthesizing method. In the liquid phase synthesis, a reaction between element ions constituting a phosphor takes place, because phosphor materials are made to react in the liquid phase, and a phosphor that is highly pure stoichiometrically can easily be obtained. Further, compared with a liquid phase synthesis wherein reactions between solid phases and steps of crushing treatment are repeated to manufacture phosphors, the liquid phase synthesis makes it possible to obtain particles each having a microscopic diameter with out conducting a step of crushing treatment, and therefore, a lattice defect in a crystal caused by stress applied in the course of crushing treatment can be avoided, and a decline of light-emission efficiency can be prevented.

Incidentally, for the liquid phase synthesis in the present embodiment, there are used a general crystallizing method represented by cooling crystallization and a coprecipitation process, and a reactive crystallizing method is used preferably in particular.

The reactive crystallizing method is a method to manufacture a precursor by mixing solutions containing elements each representing a material of a phosphor or material gases in a liquid phase or the gaseous phase, by utilizing a crystallization phenomenon. The crystallization phenomenon in this case means a phenomenon that a solid phase is precipitated from a liquid phase when physical or chemical environmental changes caused by cooling, evaporation, pH adjustment and concentration are made, or when changes are made in the state of the mixing system by chemical reactions, while, in the reactive crystallizing method, it means a manufacturing method by means of physical operations and chemical operations caused by occurrence of the crystallization phenomenon of this kind.

Incidentally, for the solvent in the case of applying the reactive crystallizing method, any solution can be used provided that reaction materials are dissolved, and water is preferable from the viewpoint of easiness of control for the degree of supersaturation. When using plural reactive materials, they may be added either simultaneously or individually in terms of an order of addition of materials, and it is possible to select appropriate order properly in accordance with activity.

For manufacturing phosphors each being more microscopic and having narrow particle size distribution, in forming precursors, it is preferable that material solution of two or more liquids is added directly to poor solvent in the presence of protective colloid.

The reactive crystallizing method in the present embodiment employs the so-called Y-shaped reaction apparatus 1 wherein a shape of provided plural flow paths is Y-shaped when the flow paths are viewed in a plane as shown in FIG. 1. Among them, the Y-shaped reaction apparatus 1 is provided with first tank 3 impounding one phosphor material solution A and with second tank 4 impounding another phosphor material solution B, and the first tank 3 and the second tank 4 are connected respectively to one end of the first flow path 5 and to one end of the, second flow path 6. Pump P1 for supplying phosphor material solution A is provided on the midway of the first flow path 5 and pump P2 for supplying phosphor material solution B is provided on the midway of the second flow path 6. The other end of the flow path 5 and the other end of the flow path 6 are connected to the third flow path 7 through connecting portion C, whereby, phosphor material solution A and phosphor material solution B supplied continuously through respective flow path 5 and flow path 6 are made to collide and are mixed at the connecting portion C.

The third flow path 7 is arranged to continuously supply a mixed solution to ripening vessel 2 that is provided below an exhaust port of the third flow path 7, in which a speed of flow of the mixed solution is higher than that of each solution supplied through each of the first flow path 5 and the second flow path 6.

In the ripening vessel 2, there is provided stirring blade 8 for stirring the mixed solution impounded in the vessel, and the stirring blade 8 is connected to driving device 9 representing a source of rotating power.

Incidentally, a manufacturing apparatus to be used is not limited to Y-shaped reaction apparatus 1, and it may also be the so-called T-shaped manufacturing apparatus wherein only a form of the flow path is different, and a shape of flow paths is T-shaped when the flow paths are viewed in a plane.

The first, second and third flow paths 5, 6 and 7 are molded to be in a cylindrical form, and each of the flow paths 5, 6 and 7 is formed to have a diameter of about 1 mm.

Incidentally, a diameter and a length of the third flow path 7 are not limited to those in the present embodiment, and any diameter and any length can be used, if the diameter and the length can satisfy a so-called stabilization time that represents a period of time required by particles formed immediately by collision and mixing at the connecting portion C to turn out to be in the stable state. In this case, the stabilization time in the present embodiment is established to 0.001 sec. or more.

Further, a period of time for a solution to stay in the Y-shaped reaction apparatus 1 while traveling through the inside thereof, namely, the so-called traveling time is preferably 0.001 sec. or more, the more preferable is 0.01 sec. or more, and the especially preferable is 0.1 sec. or more.

In addition, any pumps may be used as pumps P1 and P2 if the pumps have been known, but the preferable one is an unpulsating pump.

Although no dynamic stirring mechanism is provided in the connecting portion C in the present embodiment, the dynamic stirring mechanism such as a stirring blade may also be provided depending on a purpose, without being limited to the present embodiment.

On the other hand, ripening vessel 2 is provided below an exhaust port of the third flow path 7 in the Y-shaped reaction apparatus 1. In the ripening vessel 2, there is provided stirring blade 8 for stirring the mixed solution impounded in the vessel, and the stirring blade 8 is connected to driving device 9 representing a source of rotating power.

Incidentally, it is preferable that each of phosphor material solutions A and B is a turbulent flow substantially, when it is supplied through each of the first and second flow paths, for the purpose of preventing a back current around the connecting portion C, for the more uniform mixing of the solutions.

It is further preferable to adjust various physical characteristics such as a temperature in the course of reaction, an adding speed, a stirring speed and pH, depending on a type of the phosphor, and a supersonic wave may be irradiated in the course of reactions. It is further possible to add surface active agents or polymers for controlling particle sizes. In addition, concentration and ripening of the solution or only one of the concentration and ripening may be conducted after adding materials, as occasion demands.

A protective colloid is one to function for preventing aggregation of microscopic precursor particles, and various types of high polymer compounds may be used independently of natural and artificial ones, in which proteins among them can be used preferably.

As proteins, there are given, for example, gelatin, water-soluble protein and water-soluble glycoprotein. Specifically,. there may be given albumin, egg albumin, casein, soybean protein, synthesized protein and proteins synthesized on genetic engineering basis.

As gelatins, there are given, for example, lime-processed gelatin and oxygen-processed gelatin, and both of these can also be used in combination. In addition, hydrolysates of these gelatins and enzyme-decomposed products of these gelatins may be used.

A protective colloid does not need to be a single composition, and various binders may be mixed with the protective colloid. Specifically, for example, graft polymer of the aforesaid gelatin and other polymers can be used.

With a mean molecular weight of the protective colloid, 10,000 or more is preferable, a range of 10,000-300,000 is more preferable and that of 10,000-30,000 is especially preferable. The protective colloid can be added to one or more of material solutions, and it can be added to all material solutions, and a particle size of a precursor can be controlled depending on an added amount of the protective colloid and on a speed of adding a reaction solution.

Since various characteristics of the phosphor such as a particle size of a phosphor particle after baking, a particle size distribution and light emission characteristics are greatly influenced by properties of the precursor, it is preferable that the precursor is made small sufficiently by controlling a particle size of the precursor in the precursor forming process. If the precursor is made to be fine grains, aggregation of the precursors tends to take place, and therefore, it is extremely effective to synthesize the precursor after preventing aggregation of precursors by adding protective colloids, which makes it easy to control a particle size. Incidentally, when making the reaction to take place under existence of the protective colloids, it is necessary to consider sufficiently the particle size distribution of the precursors and elimination of impurities such as accessory salt.

In the precursor forming process of this kind, a particle size is properly controlled, and after synthesizing the precursors, they are collected in a method of filtration, evaporation exsiccation and centrifugal separation, in case of need, and then, washing and desalting process may be carried out preferably.

The desalting process is a process to remove impurities such as accessory salt from the precursor, and various film separation methods, coagulating-sedimentation method, an electric dialysis method, a method to employ ion-exchange resins and a noodle washing method may be used for the desalting process.

In the invention, from a viewpoint of improving productivity of precursors and a viewpoint of preventing coarse particles and spread of particle size distribution by removing accessory salt or impurities, a range of 0.01-20 mS/cm of electric conductivity of the desalted precursor is preferable, a range of 0.01-10 mS/cm is more preferable and a range of 0.01-5 mS/cm is especially preferable.

When the electric conductivity is adjusted to be in the aforesaid range, light-emission intensity of the phosphor obtained finally can be improved. As a method for measuring the electric conductivity, those which have been known can be applied, and, for example, an electric conductivity measuring instrument on the market can be used.

Incidentally, after the desalting process, a drying process may further be conducted. The drying process is preferably conducted after washing or desalting, and any of vacuum drying, air current drying, fluid bed drying and spray drying can be used. A drying temperature-among the foregoing is not limited in particular, and a preferable temperature is one that is equal to or higher than a temperature at which the solvent to be used is vaporized, and if the drying temperature is too high, drying and baking are carried out simultaneously, and a phosphor can be obtained without succeeding baking process, thus, a range of 50-300° C. is more preferable.

Next, a baking process will be explained.

Each of a rare earth borate phosphor, a silicate phosphor and a aluminate phosphor can be obtained when a precursor of each of them is subjected to a baking process. Conditions for baking process will be explained as follow.

A method which has been known can be used for the baking process, and baking temperature and baking time may be adjusted properly. For example, when precursors are filled in an alumina boat, to be baked at prescribed temperature in the prescribed gas atmosphere, a desired phosphor can be obtained. AS the gas atmosphere, it is possible to select from conditions including under reduction atmosphere, under oxidation atmosphere, existence of sulfide and inert gas, depending on composition of the precursor.

As an example of preferable baking conditions, there is an occasion where baking is carried out at a temperature in a range of 600-1800° C. for an appropriate period of time in the air. Further, an effective method is one to conduct baking at about 800° C. to oxidize organic matters, and then, to conduct baking at 1100° C. for 90 min. in the air.

For the baking apparatus or the baking container, a known apparatus can be used, and apparatuses of a box type, crucible furnace, a cylindrical tube type, a boat type and a rotary kiln are preferably used.

Further, in the case of baking, sinter-preventing agents may be added in case of need. When adding sinter-preventing agents, it may be added as slurry in the case of forming precursors, or powdery sinter-preventing agents may be mixed with dried precursors for baking.

The a sinter-preventing agent is not limited in particular, and it is selected properly depending on a type of a phosphor and on baking conditions. For example, metal oxides such as $TiO_2$, $SiO_2$ and $Al_2O_3$ are preferably used for baking respectively at temperatures of 800° C. or lower, 1000° C. or lower and 1700° C. or lower.

Further, after the baking process, reduction processing or oxidation processing may be conducted in case of need. Further, after the baking process, cooling process, surface treatment or classification process may be conducted.

The cooling process is a process to cool baked products obtained through the baking process, and this cooling process makes it possible to cool these baked products while they remain in the baking apparatus. The cooling process is not limited in terms of its type in particular, and it is possible to select properly from the known cooling methods such as a method wherein temperatures of baked products are lowered when baked products are left alone and a method wherein a cooling device lowers temperatures compulsorily while controlling the temperatures.

The surface treatment is processing to cause surfaces of baked products to be subjected to adsorption or covering, and a point in time for conducting the surface treatment process varies depending on its purpose, and it can be selected properly. For example, when a surface of the phosphor is covered with an oxide containing at least one type of element selected from Si, Ti, Al, Zr, Zn, In and Sn, at a certain point in time before the succeeding dispersion processing step, a decline of crystallinity of the phosphor in the course of dispersion processing can be controlled, and when preventing further that exciting energy is captured by surface defect of the phosphor, a decline of light-emission intensity can be controlled. Further, when a surface of the phosphor is covered with an organic high molecular compound at a certain point in time after the dispersion processing step, a special feature such as weather resistance is improved, and a highly durable phosphor can be obtained. A thickness and a coverage of a covering layer in the case of conducting the surface treatment process mentioned above can be controlled properly on an optional basis.

Next, the dispersion processing step will be explained. As an apparatus used for dispersion processing, there are given, for example, an impeller type homogenizer of a high speed stirring type, an apparatus wherein media are moved to be changed into fine grains by both of their collision and shearing force, such as a colloid mill, a roller mill, or a ball mill, a vibration ball mill, an attritor, a planetary mill and a sand mill, a dry type homogenizer such as a cutter mill, a hammer mill and a jet mill, a ultrasonic homogenizer and a high pressure homogenizer.

Among the foregoing, it is preferable to use a wet media type homogenizer employing especially media, in the invention, and it is more preferable to use a homogenizer of a continuous and wet media type that is capable of conducting dispersion processing continuously. It is further possible to apply an embodiment wherein a plurality of homogenizers of a continuous and wet media type are connected in series.

The expression "capable of conducting dispersion processing continuously" mentioned in this case means an embodiment wherein at least phosphors and dispersion media are supplied to a homogenizer at a constant ratio per unit time without being interrupted for dispersion processing, and dispersed products manufactured in the homogenizer are ejected out of the homogenizer without being interrupted, in a way that dispersed products are pushed out by a supply. When using a homogenizer of a wet and media type employing media in the dispersion processing step in a method for manufacturing a phosphor, a type of its container for dispersion chamber, namely, a type of a vessel can be selected properly from a vertical type and a horizontal type.

When a precursor is formed by a liquid phase method in the precursor forming step, a phosphor particle obtained in the aforesaid baking step can be made to be one which is uniform in terms of composition and has a less amount of nonreacted substances. Further, by conducting particle size control properly in the precursor forming step, it is possible to obtain phosphor particles having a particle size distribution that is ±50% or less of an average particle size from phosphors having fine particles whose average particle size is in a range of 20 nm-5 μm. Incidentally, the content of phosphor particles, based on a phosphor-dispersed solution is 5-30% by weight, and preferably 10-20% by weight.

Since phosphor particles are in a form of fine grains and have a narrow particle size distribution, the phosphor particles can be filled densely in a phosphor layer provided on PDP, whereby, the light-emission intensity of PDP can be improved. Further, a uniform particle size makes graceful light-emission having no unevenness possible.

Incidentally, from the viewpoint of obtaining phosphor particles which are fine grains and have narrow particle size distribution, it is preferable that the phosphor particles are manufactured by the use of a liquid phase synthesis. However, the method for manufacturing a phosphor in the invention is not limited to the liquid phase synthesis, and a method which has been known can also be used for manufacturing the phosphors, and a solid phase synthesis may also be used without being limited to the liquid phase synthesis.

The surface treatment process will be explained, lastly.

The surface treatment is conducted by etching processing which can be selected depending on impurities on the surface of a phosphor particle. For example, a physical method to grind the surface by fine grains spattering or ion spattering may be used, but the effective is a chemical method to dip phosphor particles in an etching solution to dissolve impurities on the surface. In this case, however, the etching processing needs to be carried out carefully, because light-emission intensity is lowered if a phosphor particle main body is corroded by the etching solution.

Figure 2:
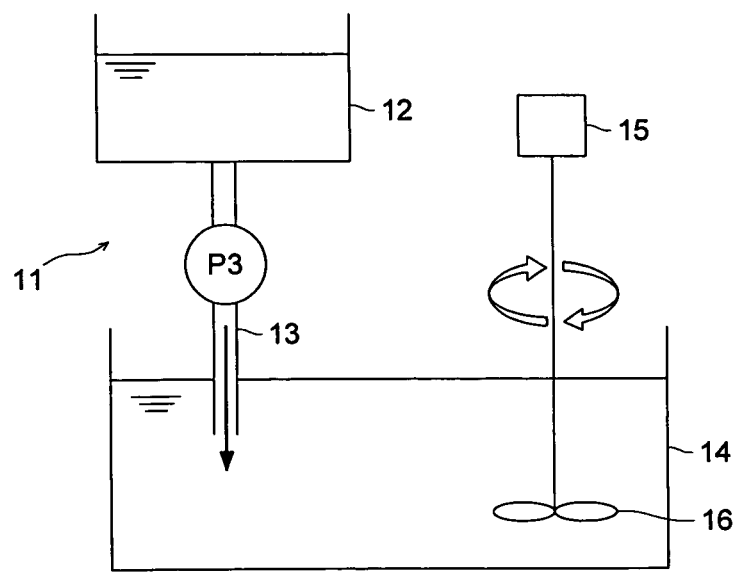
FIG. 2 is a schematic diagram showing an ordinary reaction apparatus.

For the etching processing, there is used reaction apparatus 11 shown in FIG. 2 that is arranged so that an etching solution stored in tank 12 is added by pump P3 to a phosphor-dispersed solution stored in container 14 through flow path 13. Further, stirring blade 16 connected to driving device 15 is provided in the same way as in the Y-shaped reaction apparatus 1, so that a solution after mixing may be stirred.

Figure 3:
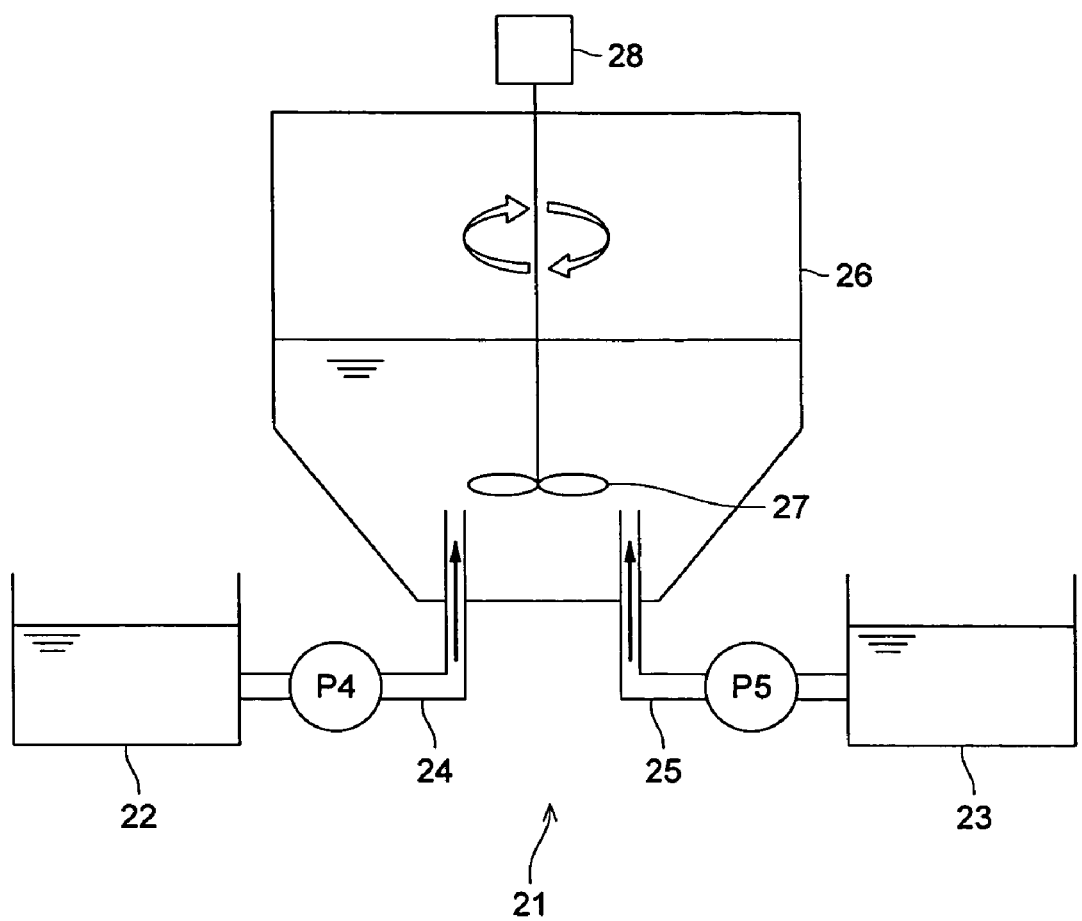
FIG. 3 is a schematic diagram showing a double-jet reaction apparatus.

Incidentally, the reaction apparatus to be used is not limited to the reaction apparatus 11 shown in FIG. 2, and it may be either the aforesaid Y-shaped reaction apparatus 1 or double-jet reaction apparatus 21 employing a double-jet method to add two types reaction solutions simultaneously to the liquid through respective nozzles as shown in FIG. 3.

On the double-jet reaction apparatus 21, there are provided first tank 22 and second tank 23 which are connected respectively to one end of first flow path 24 and one end of second flow path 25. In addition, pump P4 and pump P5 are provided respectively on the middle of the first flow path 24 and on the middle of the second flow path 25.

Reaction vessel 26 is provided below the other ends of the first flow path 24 and the second flow path 25, so that solutions stored separately in the first tank 22 and the second tank 23 may be supplied to the reaction vessel. On the reaction vessel 26, there is provided stirring blade 28 that is connected to driving device 27 so that the solution after mixing may be stirred.

Incidentally, since the phosphor related to the invention has no role to improve light-emission intensity with projections on the surface, unlike a phosphor of an electrolytic light-emission type, it is preferable to conduct etching processing for a phosphor particle having less projections or no projections on the particle surface, from viewpoints of filling phosphor particles densely in the phosphor layer and of conducting etching processing evenly on the surface of the phosphor particle.

Further, preferable stirring time is in a range of 5 seconds—2 hours after addition of acid is completed, and a range of 20 minutes—1 hour is more preferable, because light-emission intensity is lowered if the stirring time is out of the aforesaid range.

In addition, a range of 0.001-0.005 mol per 1 g of phosphor is preferable as an added amount of etching solutions, and an amount of about 0.002 mol is more preferable.

In addition to the foregoing, a range of $1.2 \times 10^{-16}$-$7.0 \times 10^{-15}$ mol/min. per 1 $m^2$ of specific surface area of a phosphor is preferable as a speed of adding etching solutions, and a range of $2.0 \times 10^{-16}$-$5.0 \times 10^{-15}$ mol/min. is more preferable.

Further, a temperature of an etching solution is preferably in a range of 20-60° C., and a range of 30-50° C. is more preferable.

A type of an etching solution is determined depending on impurities, and it may be either acid or alkaline, and it may be either an aqueous solution or an organic solvent. In this case, when an acid aqueous solution is used, an effect is shown remarkably, and a strong acid is especially used, accordingly.

Incidentally, as a strong acid, hydrochloric acid, nitric acid, sulfuric acid, phosphoric acid and perchloric acid can be applied, and hydrochloric acid, nitric acid and sulfuric acid among them are especially preferable.

When concentration of a strong acid becomes higher, concentration of substances dissolving out grows to be higher, resulting in a fear that substances removed during etching processing may adsorb on the particle surface again, and an amount of a surface layer of phosphor particles to be removed is increased, thereby, industrial efficiency is lowered. In addition, localized concentration tends to take place in the course of etching, which makes it difficult to conduct etching processing evenly between particles, resulting in lowered effect for the light-emission intensity.

When concentration of a strong acid is lowered, on the other hand, an amount of impurities on the phosphor particle surface is reduced, resulting in residual impurities on the particle surface, and an effect for light-emission intensity is lowered.

A liquid measure of strong acids necessary for etching processing for phosphor particles is increased, which makes industrial handling difficult. It is therefore desirable to adjust concentration of a strong acid to the most preferable value in accordance with circumstances.

When these strong acids are used as an etching solution, concentration of the etching solution that is 0.001N or more and is less than 6N is preferable, concentration that is 0.001N or more and is less than 2.5N is more preferable, and concentration that is 0.001N or more and is less than 0.25N is especially preferable. When etching processing is conducted by the use of a strong acid relating to concentration that is 0.001N or more and is less than 6N, more desirable effect can be obtained, and when a strong acid relating to concentration that is 0.001N or more and is less than 0.25N is used, only impurities can be dissolved efficiently, concentration of substances dissolving out is low, and it is difficult for removed substances to adsorb again to the particle surface. It is further possible to control localized concentration of strong acids in the case of etching, and thereby to conduct etching processing evenly on the particle surface.

For example, when etching processing is conducted by the use of hydrochloric acid for $Zn_2SiO_4:Mn^{2+}$, $Zn_2SiO_4$ is dissolved in hydrochloric acid under the following formula, and a surface layer of a phosphor particle is removed.

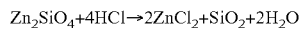

$$Zn_2SiO_4 + 4HCl \rightarrow 2ZnCl_2 + SiO_2 + 2H_2O$$

The reaction formula above shows that an amount of $Zn_2SiO_4$ to be dissolved, namely, an amount to be removed by etching processing can be controlled by changing an amount of strong acids to react on unit mol of a phosphor. For example, when 2% of phosphor particle of 1 mol is required to be dissolved, namely, when removing it by etching processing, it has only to react on hydrochloric acid.

Incidentally, it is preferable that an amount of the surface of the phosphor particle to be dissolved and removed by the etching processing is 1.5 mol % or more and is less than 20 mol %. It is further preferable to conduct water washing after the etching to remove an etching solution.

Thus, in the method for manufacturing a phosphor relating to the invention, a speed of adding etching solutions in the surface treatment step is in a range of $1.2 \times 10^{-16} - 7.0 \times 10^{-15}$ mol/min. per 1 $m^2$ of specific surface area of a phosphor particle, and therefore, it is possible to mix evenly a solvent in which phosphor particles are dispersed and an etching solution, by controlling the speed of adding etching solutions, whereby, uniform surface treatment can be carried out.

In addition, since a phosphor manufactured by the method for manufacturing a phosphor in the invention has been subjected to uniform surface treatment, damage of a phosphor main body caused by an etching solution can be prevented, and light-emission intensity of the phosphor can be improved accordingly.

Lastly, PDP employing the phosphor stated above will be explained as follows.

Though the PDP is generally classified roughly into a DC type PDP on which DC voltage is impressed and an AC type PDP on which AC voltage is impressed, the PDP will be explained in detail as follows, referring to the AC type PDP shown in FIG. 4, in the present embodiment.

Figure 4:
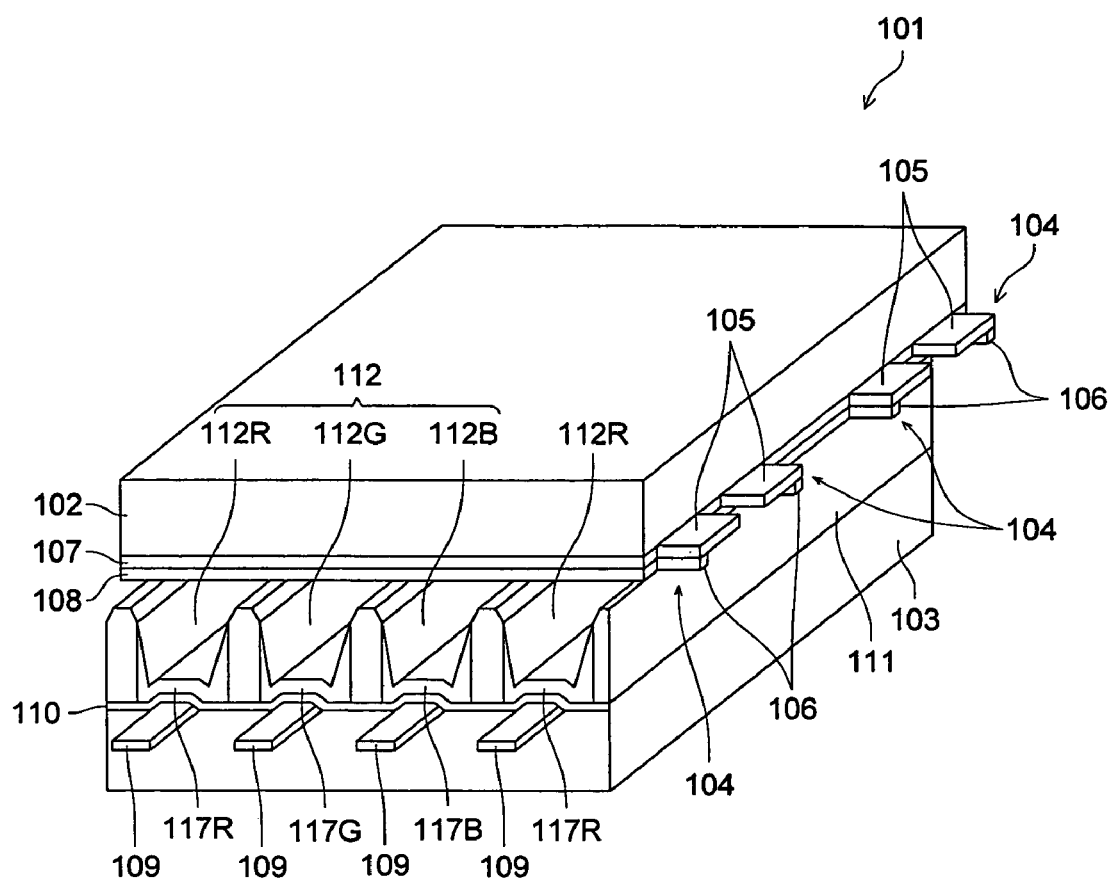
FIG. 4 is a perspective drawing showing an example of a plasma display panel relating to the invention.
Figure 4:
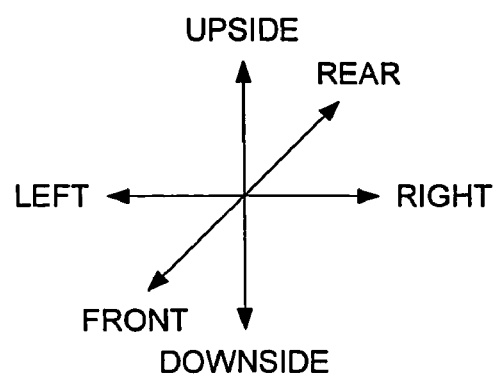

PDP 101 in the present embodiment is composed of front base plate 102 that is formed to be in a form of a flat plate and of back base plate 103 which is substantially the same as the front base plate 102 in terms of a form and is arranged at a position to face one side of the front base plate 102, as shown in FIG. 4. Among these base plates 102 and 103, the front base plate 102 transmits visible light emitted from a discharge cell to show various pieces of information on the base plate, and it functions as a display screen of the PDP 101.

In this front base plate 102, there is properly used soda lime glass, namely, a material that transmits visible light such as a so-called blue plate glass, and its thickness is in a range 1-8 mm preferably, and is 2 mm more preferably.

A plurality of display electrodes 104 are arranged at regular intervals on a side of the front base plate 102, the side facing the back base plate 103. On the display electrode 104, there are provided transparent electrode 105 formed to be in a form of a wide strap and bus electrode 106 formed to be in the same form as that of the transparent electrode 105, in a way to form a structure in which the bus electrode 106 is laminated on the upper surface of the transparent electrode 105.

The display electrodes 104 intersects partition 112 at right angles when they are viewed on a plane, and one set of the display electrode 104 is composed of two display electrodes 104 which are arranged at positions to face each other through a prescribed discharge gap.

A transparent electrode such as nesa film can be used as the transparent electrode 105, and its sheet resistance is preferably 100 Ω or less. Further, a range of 10-200 μm is preferable for a width of the transparent electrode 105.

The bus electrode 106 is one to lower the resistance, and it is formed through spattering of CR/CU/Cr. The bus electrode 106 is formed to be smaller than the transparent electrode 105 in terms of a width, and a range of 5-50 μm is preferable for the width.

The total surface of the display electrodes 104 arranged on the front base plate 102 is covered with dielectric layer 107. The dielectric layer 107 can be formed with dielectric substances such as low-melting point glass, and its preferable thickness is within a range of 20-30 μm.

The total surface on the top face of the dielectric layer 107 is covered with protective layer 108. A MgO film can be used as the protective layer 108, and its preferable thickness is in a range of 0.5-50 μm.

On the other hand, in the back base plate 103 arranged at a position to face one side of the front base plate 102, there is properly used soda lime glass, namely, a so-called blue plate glass, in the same way as in the front base plate 102, and its thickness that is in a range 1-8 mm is preferable, and about 2 mm is more preferable.

A plurality of address electrodes 109 are arranged on a side of the back base plate 103, the side facing the front base plate 102. These address electrodes 109 are formed to be in a form identical to that of the transparent electrodes 105 and bus electrodes 106, and are arranged at regular intervals so that the address electrodes intersect the display electrodes 104 at right angles when they are viewed on a plane. Metal electrodes such as Ag thick film electrodes can be used as the address electrodes 109, and a preferable width for each of them is within a range of 100-200 μm.

The total surface of the address electrode 109 is covered with dielectric layer 110, and this dielectric layer 110 can be formed with dielectric substances such as low-melting point glass, and its preferable thickness is within a range of 20-30 μm.

On the top of the dielectric layer 110, there are arranged partitions 111 which are in a form to protrude in the direction perpendicular to the back base plate 3. These partitions 111 are formed to be long, and are-arranged so that adjoining partitions 111 located at both sides of address electrode 109 may be in parallel each other in terms of their lengthwise directions. A plurality of microscopic discharge spaces (hereinafter referred to as discharge cell 112) each being formed to be in a prescribed shape by partitions 111 are formed to be in a form of stripes when they are viewed on a plane.

The partition 111 can be formed by dielectric substance such as low-melting point glass, and its width ranging from 10 μm to 500 μm is preferable, and that of about 100 μm is more preferable. A height of the partition 111 is usually in a range 10-100 μm, and that of about 50 μm is preferable.

With respect to the discharge cell 112 in the present embodiment, when the front base plate 102 and the back base plate 103 are arranged horizontally, partitions 111 are arranged to be in parallel with each other for each prescribed distance, namely, they are arranged in a form of stripes, thus, the discharge cell 112 is called a stripe type.

Figure 5:
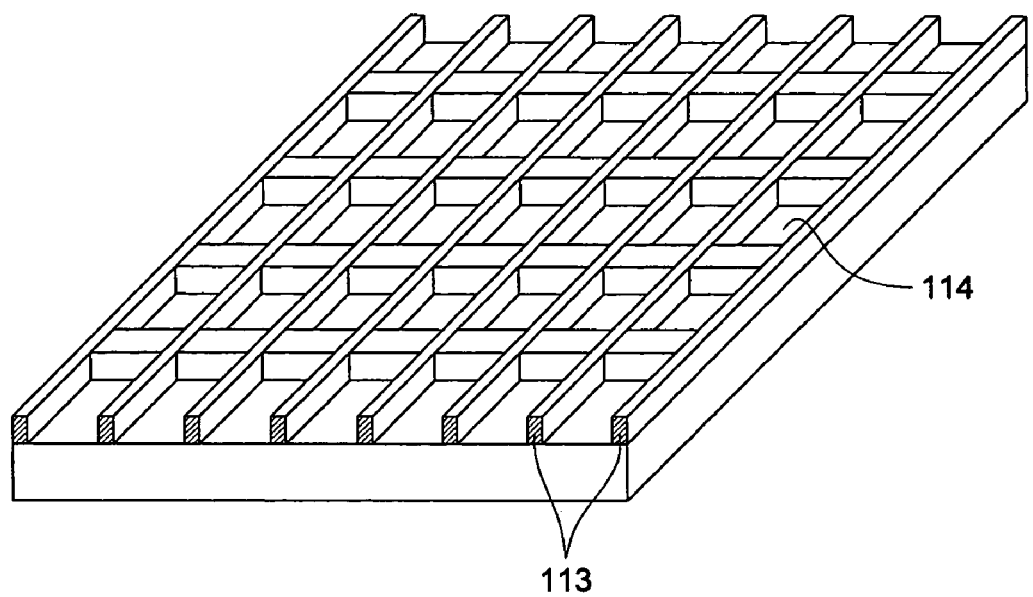
FIG. 5 is a perspective drawing showing a structure of another discharge cell.
Figure 6:
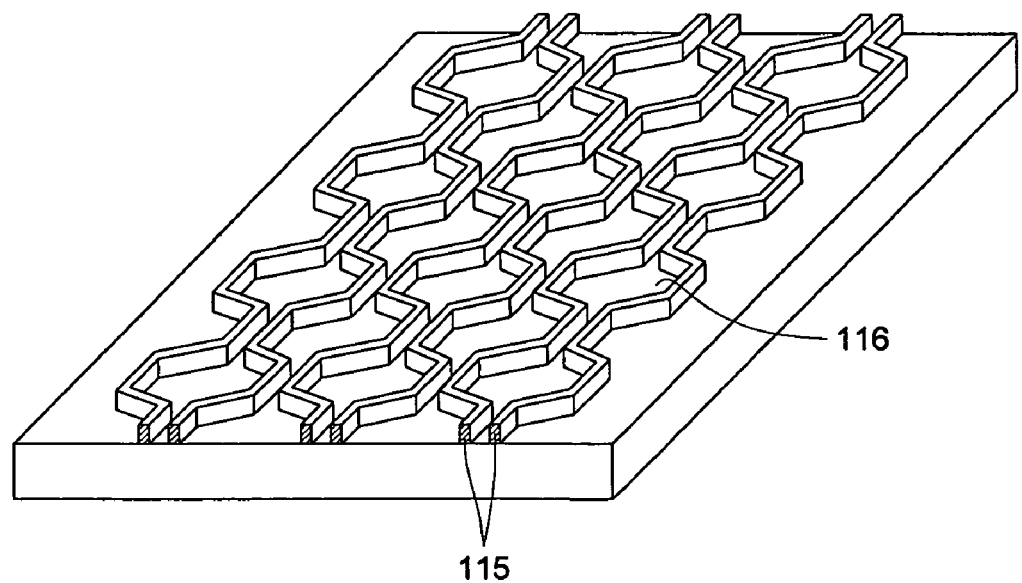
FIG. 6 is a perspective drawing showing a structure of another discharge cell.

Incidentally, a structure of the discharge cell is not limited to the one of a stripe type of this kind, and it may be either discharge cell 114 of a grating type provided in a form of a grating when partitions 113 are viewed on a plane, as shown in FIG. 5, or discharge cell 116 in a form of a honeycomb (or octagon) formed by one set of partitions 115 which are symmetrical each other and are crooked, as shown in FIG. 6.

On each of discharge cells 112R, 112G and 112B, any of phosphor layers 117R, 117G and 117B composed of a phosphor that emits light of any of red (R), green (G) and blue (B) manufactured in the present embodiment is provided in a fixed order. In a cavity inside each of discharge cell 112R, 112G and 112B, there is filled discharge gas, and there is provided at least one point where display electrode 104 intersects address electrode 109 when they are viewed on a plane. Further, a thickness of each of phosphor layers 117R, 117G and 117B is not limited in particular, and it is preferably in a range of 5-50 μm.

Each of phosphor layers 117R, 117G and 117B is formed on a side or bottom surface of a partition. Concerning these phosphor layers 117R, 117G and 117B, phosphor paste is made first, by dispersing the phosphors in the mixture containing binders, solvents and dispersing agents. Then, the phosphor paste is adjusted to appropriate viscosity, and then is coated on or filled in each of discharge cells 112R, 112G and 112B, to be dried or baked finally to form a phosphor.

Incidentally, the phosphor paste can be adjusted by a known method. As a method for coating phosphor paste on each of discharge cells 112R, 112G and 112B or filling phosphor paste in each of discharge cells 112R, 112G and 112B, a screen printing method, a photoresist film method and an ink-jet process can be used.

In PDP 101 having the aforesaid structure, trigger discharge is conducted selectively between address electrode 109 and display electrode 104 that is one of a set of display electrodes 104 and 104, whereby, a discharge cell conducting display is selected. After that, inside the selected discharge cell, sustain discharge is conducted between a set of display electrodes 104 and 104, and thereby, ultraviolet radiation caused by discharge gas is generated and visible light is generated from each of phosphor layers 117R, 117G and 117B.

Thus, in PDP 101 relating to the invention, a phosphor obtained through the manufacturing method of the invention is contained in each of phosphor layers 117R, 117G and 117B in each of discharge cells 112R, 112G and 112B, and thus, light-emission intensity of discharge cells 112R, 112G and 112B can be improved, and thereby, light-emission intensity of PDP 101 can be improved.

EXAMPLE

A phosphor manufacturing relating to the invention and an example of the phosphor will be explained, next.

Example 1

In the present example, phosphor 1 was synthesized as a green color emitting phosphor employing a material of $Zn_2SiO_4:Mn^{2+}$, then, surface treatment was conducted with an etching solution on the phosphor 1 thus obtained, and thereby, phosphors 2, 3, 4, 5, 6, 7, 8, 9, 10, 11, 12 and 13 after the surface treatment process were obtained, and evaluation was made based on relative light-emission intensity before and after VUV irradiation on each of phosphors 1, 2, 3, 4, 5, 6, 7, 8, 9, 10, 11, 12 and 13.

First, a synthesizing method of phosphor 1 will be explained.

Colloidal silica containing 45 g of silicon dioxide (PL-3 produced by Fuso Chemical Co., Ltd.), 219 g of 28% ammonia water and pure water were mixed, and an amount of solution was adjusted to 1500 cc to prepare solution A.

On the other hand, 424 g of zinc nitrate 6 hydrate (produced by Kantokagaku Co.: purity 99.0%) and 21.5 g of manganese nitrate 6 hydrate (produced by Kantokagaku Co.: purity 99.0%) were dissolved in pure water and an amount of solution was adjusted to 1500 cc to prepare solution B.

These solutions A and B were stored respectively in tank 3 and tank 4 of Y-shaped reaction apparatus 1 as shown in FIG. 1, and they were kept at 40° C. Then, solution A and solution B were supplied to ripening vessel 2 at a speed of 1200 cc/min. respectively by pump P1 and pump P2, then, sediment obtained through reaction was diluted by pure water, and after that, the solution was subjected to liquid-solid separation conducted by a pressure filtration method, thus, dried precursor was obtained by drying at 100° C. for 12 hours.

Finally, the precursor thus obtained was baked for 7 hours at the temperature of 1200° C. in the atmosphere of nitrogen 100%, to obtain phosphor 1.

Then, after pure water in the same amount was added, the phosphor 1 was subjected to shredding and dispersion processing by a pot mill, and classification processing by a screen was further conducted to remove microscopic particles and coarse particles.

Then, phosphor-dispersed solution after the classification and 2N hydrochloric acid were stored respectively in reaction apparatus 11 and reaction vessel 14 shown in FIG. 2 to be kept at the temperature of 40° C., and then, 2N hydrochloric acid was added in a liquid of phosphor-dispersed solution by pump 3. In this case, an adding speed of hydrochloric acid was adjusted to $1.2 \times 10^{-16}$ mol/min. per 1 $m^2$ of specific surface area of the phosphor, and an amount of hydrochloric acid added was adjusted to 0.001 mol per 1 g of the phosphor.

After completion of addition, mixed solution thus obtained was stirred for 20 minutes, then, it was washed by pure water, and was dried at a temperature of 100° C. for 12 hours, thus, phosphor 2 was obtained.

In the method for manufacturing a phosphor mentioned above, a speed of adding hydrochloric acid was changed to $1.0 \times 10^{-16}$, $5.0 \times 10^{-16}$, $5.0 \times 10^{-15}$, $7.0 \times 10^{-15}$ and $7.5 \times 10^{-15}$ mol/min. per 1 $m^2$ of specific surface area of a phosphor, and an amount of hydrochloric acid added was changed to 0.002, 0.003, 0.005 and 0.0055 mol per 1 g of phosphor, and phosphors obtained by combining these speeds of adding hydrochloric acid and amounts of hydrochloric acid added were made to be phosphors 3, 4, 5, 6, 7, 8, 9, 10, 11, 12 and 13, while, speeds of adding hydrochloric acid and amounts of addition for each phosphor are shown in Table 1.

Next, how to evaluate relative light-emission intensity before and after irradiation of VUV will be explained.

First, phosphors 1, 2, 3, 4, 5, 6, 7, 8, 9, 10, 11, 12 and 13 obtained were introduced to the inside of a vacuum tank of 0.1-1.5 Pa, and excimer 146 nm lamp (produced by Ushio Electronic Inc.) was used to irradiate the phosphors with VUV. Then, a peak intensity of green light obtained by the irradiation was measured by a detector (MCPD-3000: produced by Otsuka Electronics Co., Ltd.), and the relative light-emission intensity representing a relative value wherein light-emission intensity before surface treatment is 100 was calculated. The relative light-emission intensity calculated in this case was made to be "relative light-emission intensity before discharge" which is shown in Table 1.

Further, respective phosphors 1, 2, 3, 4, 5, 6, 7, 8, 9, 10, 11, 12 and 13 were covered with 0.5 mm-thick $MgF_2$ plate, then, were introduced to the inside of a discharge space filled with gas in which xenon gas occupied 5% of neon was mixed, then, discharge was conducted for 1 hour, and the relative light-emission was calculated by the aforesaid method. The relative light-emission intensity calculated in this case was made to be "relative light-emission intensity after discharge" which is shown in Table 1.

Further, the relative light-emission intensity after discharge was divided by the relative light-emission intensity before discharge, and the quotient was converted into a percentage, and a value therefrom was made to be a maintenance rate (%) which is shown in Table 1. Concerning this maintenance rate, when its numerical value is higher, a decline of light-emission intensity by VUV is more controlled, namely, hydrochloric acid does not damage a phosphor main body, and a surface layer damaged by a crushing treatment process and impurities adhering to the surface are removed, while, when the numerical value is lower in contrast to the foregoing, the phosphor main body is damaged by hydrochloric acid and surface layers and impurities are not removed.

TABLE 1

| | 2N hydrochloric acid | | | | |
|---|---|---|---|---|---|
| Phosphor No. | Added amount (mol/phosphor g) | Adding speed per 1 $m^3$ of phosphor specific surface area (mol/min.) | Relative light-emission intensity Before discharge | After discharge | Maintenance rate (%) |
| 1 | — | — | 100 | 70 | 70 |
| 2 | 0.001 | $1.2 \times 10^{-16}$ | 120 | 108 | 90 |
| 3 | 0.002 | $1.0 \times 10^{-16}$ | 110 | 80 | 73 |
| 4 | 0.002 | $5.0 \times 10^{-16}$ | 135 | 128 | 95 |
| 5 | 0.002 | $5.0 \times 10^{-15}$ | 135 | 128 | 95 |
| 6 | 0.002 | $7.0 \times 10^{-15}$ | 135 | 125 | 93 |
| 7 | 0.002 | $7.5 \times 10^{-15}$ | 135 | 100 | 74 |
| 8 | 0.003 | $5.0 \times 10^{-15}$ | 138 | 125 | 91 |
| 9 | 0.003 | $7.5 \times 10^{-15}$ | 138 | 105 | 76 |
| 10 | 0.005 | $5.0 \times 10^{-15}$ | 135 | 125 | 93 |
| 11 | 0.005 | $7.5 \times 10^{-15}$ | 135 | 100 | 74 |
| 12 | 0.0055 | $5.0 \times 10^{-15}$ | 135 | 115 | 85 |
| 13 | 0.0055 | $7.5 \times 10^{-15}$ | 135 | 100 | 74 |

As a result, it was found out that the maintenance rate of phosphor 1 which has not been subjected to surface treatment by hydrochloric acid is lower than those of phosphors 2, 3, 4, 5, 6, 7, 8, 9, 10, 11, 12 and 13 which have been subjected to surface treatment, independently of an added amount and adding speed of hydrochloric acid. It was further found that the maintenance rates of phosphors 2, 4, 5, 6, 8, 10 and 12 which were adjusted, in terms of an adding speed of hydrochloric acid, to be within a range of $1.2 \times 10^{-16}$-$7.0 \times 10^{-15}$ mol/min. were higher than those of phosphors 1, 3, 7, 9, 11 and 13 which were adjusted to be out of the aforesaid range to $1.0 \times 10^{-16}$ or $7.5 \times 10^{-15}$ mol/min., independently of an added amount of hydrochloric acid, and that the maintenance rates of phosphors adjusted to be within the range were higher by about 10-20, when the comparison was made only for the phosphors each having the same added amount of hydrochloric acid. When paying attention to phosphors 2, 4, 5, 6, 8, 10 and 12, it was found out that all of the maintenance rates of phosphors 2, 4, 5, 6, 8 and 10 adjusted, in terms of an added amount of hydrochloric acid, to be within a range of 0.001-0.005 mol were 90% or more, while, phosphor 12 adjusted to 0.0055 mol was 85%.

Example 2

Phosphors 21, 22, 23, 24 and 25 were obtained by conducting surface treatment under the same conditions as in phosphor 6 in Example 1, except that temperature of, hydrochloric acid in the course of surface treatment was changed to 15° C., 25° C., 40° C., 55° C. and 65° C. For the phosphors 21, 22, 23, 24 and 25 thus obtained, relative light-emission intensity before VUV irradiation and relative light-emission intensity after VUV irradiation were calculated in the same way as in Example 1, and they are shown in Table 2 together with maintenance rates.

TABLE 2

| Temperature for adding | Relative light-emission intensity | | Maintenance rate (%) |
|---|---|---|---|
| | Before discharge | After discharge | |
| 15° C. | 140 | 115 | 82 |
| 25° C. | 137 | 125 | 91 |
| 40° C. | 135 | 125 | 93 |
| 55° C. | 130 | 120 | 92 |
| 65° C. | 120 | 105 | 88 |

As a result, it was found out that all of the maintenance rates of phosphors 22, 23 and 24 adjusted respectively to 25° C., 40° C. and 55° C. in terms of temperature of hydrochloric acid were 90% or more, while, phosphors 21 and 25 adjusted respectively to 15° C. and 65° C. were 82% and 88%.

Example 3

Figure 7:
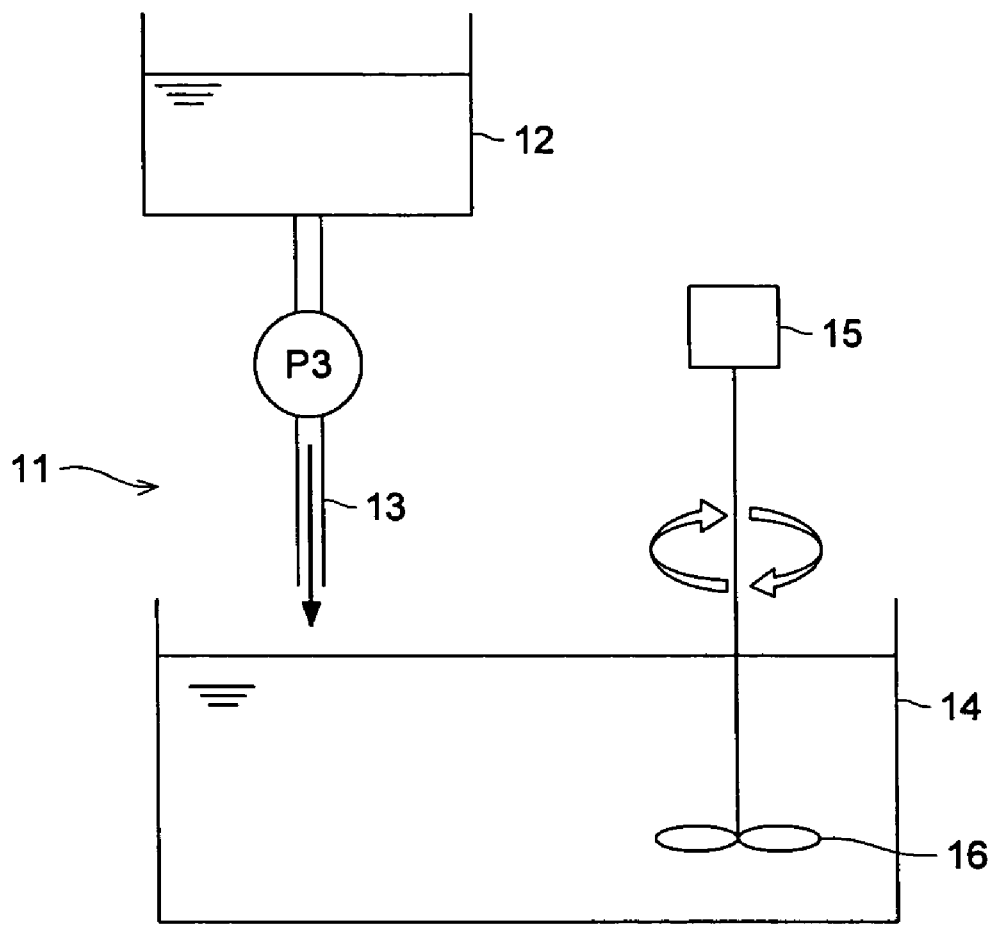
FIG. 7 is a schematic diagram showing another embodiment of a reaction apparatus shown in FIG. 2.

Phosphors 31 and 32 were obtained by conducting surface treatment under the same conditions as in phosphor 6 in Example 1, except that a position of adding hydrochloric acid for the phosphor-dispersed solution stored in reaction vessel 11 was distinguished between the inside of a liquid (FIG. 2) and the surface of a liquid (FIG. 7). For the phosphors 31 and 32 thus obtained, relative light-emission intensity before VUV irradiation and relative light-emission intensity after VUV irradiation were calculated in the same way as in Example 1, and they are shown in Table 3 together with maintenance rates.

TABLE 3

| Temperature for adding | Relative light-emission intensity | | Maintenance rate (%) |
| --- | --- | --- | --- |
| | Before discharge | After discharge | |
| Inside of liquid | 135 | 125 | 93 |
| Surface of liquid | 130 | 115 | 88 |

As a result, it was found out that the maintenance rate of phosphor 31 wherein a position of adding hydrochloric acid for the phosphor-dispersed solution was adjusted to the surface of a liquid was 88%, while, the maintenance rate of phosphor 32 wherein the position was adjusted to the inside of a liquid was 93%, showing that a decline of light-emission intensity after discharge is more controlled for the phosphor 32 manufactured in the way of adding in the inside of a liquid.

Example 4

Pure water was stored in reaction vessel 26 of double-jet reaction apparatus 21 shown in FIG. 3, and was kept at a temperature of 40° C. Further, a phosphor-dispersed solution after classification in Example 1 and 2N hydrochloric acid were stored respectively in first tank 22 and second tank 23, and they were kept at a temperature of 40° C. Then, the phosphor-dispersed solution after classification and 2N hydrochloric acid were supplied simultaneously to pure water stored in the reaction vessel 26, respectively by pump P4 and pump P5. In this case, adjustment was made so that adding speed of hydrochloric acid may be $5.0 \times 10^{-15}$ mol/min. per 1 $m^2$ of specific surface area of phosphor, and an added amount of hydrochloric acid may be 0.002 mol per 1 g of phosphor.

After completion of the supply, a mixed solution thus obtained was washed by pure water after being stirred for 20 minutes, and was dried for 12 hours at a temperature of 100° C., whereby, phosphor 41 was obtained.

For the phosphors 41 thus obtained, relative light-emission intensity before VUV irradiation and relative light-emission intensity after VUV irradiation were calculated in the same way as in Example 1, and they are shown in Table 4 together with maintenance rates. As a comparative example, Table 4 shows relative light-emission intensity and maintenance rates of phosphor 4 in Example 1 wherein an adding speed and an added amount of hydrochloric acid were the same, and a form only of the apparatus used was different.

TABLE 4

| Reaction apparatus | Relative light-emission intensity | | Maintenance rate (%) |
| --- | --- | --- | --- |
| | Before discharge | After discharge | |
| Reaction apparatus shown in FIG. 2 | 135 | 128 | 95 |
| Double-jet reaction apparatus | 140 | 135 | 96 |

As a result, it was found out that the maintenance rate of phosphor 4 in Example 1 manufactured by the use of reaction apparatus 11 was 95%, while that of phosphor 41 manufactured by the use of double-jet reaction apparatus 21 was 96%, showing that a decline of light-emission intensity after discharge is more controlled for the phosphor 41 manufactured by the use of double-jet reaction apparatus 21.

Example 5

A phosphor-dispersed solution and 2N hydrochloric acid were stored respectively in tank 3 and tank 4 of Y-shaped reaction apparatus 1 shown in FIG. 1, and they were kept at a temperature of 40° C. Then, the phosphor-dispersed solution and 2N hydrochloric acid were supplied simultaneously to ripening vessel 2 respectively by pump P1 and pump P2. In this case, adjustment was made so that an adding speed of hydrochloric acid may be $5.0 \times 10^{-15}$ mol/min. per 1 $m^2$ of specific surface area of phosphor, and an added amount of hydrochloric acid may be 0.002 mol per 1 g of phosphor.

After completion of the supply, a mixed solution thus obtained was washed by pure water after being stirred for 20 minutes, and was dried for 12 hours at a temperature of 100° C., whereby, phosphor 51 was obtained.

For the phosphors 51 thus obtained, relative light-emission intensity before VUV irradiation and relative light-emission intensity after VUV irradiation were calculated in the same way as in Example 1, and they are shown in Table 5 together with maintenance rates. As a comparative example, Table 4 shows relative light-emission intensity and maintenance rates of phosphor 4 in Example 1 wherein an adding speed and an added amount of hydrochloric acid were the same, and a form only of the apparatus used was different.

TABLE 5

| Reaction apparatus | Relative light-emission intensity | | Maintenance rate (%) |
| --- | --- | --- | --- |
| | Before discharge | After discharge | |
| Reaction apparatus shown in FIG. 2 | 135 | 128 | 95 |
| Y-shaped reaction apparatus | 140 | 137 | 98 |

As a result, it was found out that the maintenance rate of phosphor 4 in Example 1 manufactured by the use of reaction apparatus 11 was 95%, while that of phosphor 51 manufactured by the use of Y-shaped reaction apparatus 1 was 98%, showing that a decline of light-emission intensity after discharge is more controlled for the phosphor 51 manufactured by the use of Y-shaped reaction apparatus 1.

With a background stated above, in the method for manufacturing a phosphor, the phosphor and the plasma display panel, all relating to the invention, the phosphor manufacturing method having therein a step of crushing treatment to conduct a crushing treatment process for phosphor particles and a step of crushing treatment to conduct surface treatment for phosphor particles dispersed in a solution by adding an etching solution makes it possible to conduct stable surface treatment by controlling an adding speed of an etching solution, because the adding speed of the etching solution is $1.2 \times 10^{-16}$ -$7.0 \times 10^{-15}$ mol/min. per 1 $m^2$ of specific surface area of a phosphor particle, then to conduct uniform surface treatment accordingly, and to control damage of a phosphor main body caused by an etching solution, and thereby to improve light-emission intensity for the phosphor and the plasma display panel.

EFFECT OF THE INVENTION

The invention described in Structure 1 makes it possible to mix uniformly a solvent wherein phosphor particles are dispersed and an etching solution, by controlling the adding speed of the etching solution, and thereby to conduct uniform surface treatment, in a phosphor manufacturing method having therein a step of crushing treatment to conduct a crushing treatment process for the phosphor particle and a step of surface treatment to conduct a surface treatment process by adding an etching solution for the phosphor particles dispersed in a solvent, because the adding speed of the etching solution is $1.2\times10^{-16}$-$7.0\times10^{-15}$ mol/min. per specific surface area 1 m$^2$ of the phosphor particle.

The invention described in Structure 2 makes it possible to mix uniformly a solvent wherein phosphor particles are dispersed and an etching solution and thereby to obtain more preferable effects, by controlling an added amount of the etching solution, because an added amount of the etching solution is 0.001-0.005 mol per 1 g of phosphor.

The invention described in Structure 3 makes it possible to mix more uniformly a solvent wherein phosphor particles are dispersed and an etching solution and thereby to obtain more preferable effects, by controlling a temperature of addition of the etching solution, because a temperature of addition of the etching solution is 20-60° C.

The invention described in Structure 4 makes it possible to mix more uniformly a solvent wherein phosphor particles are dispersed and an etching solution and thereby to obtain more preferable effects, by changing a position for adding the etching solution, because the etching solution is added in a solvent wherein phosphor particles are dispersed.

The invention described in Structure 6 makes it possible to mix more uniformly a solvent wherein phosphor particles are dispersed and an etching solution and thereby to obtain more preferable effects, by changing a form of the apparatus to be used, because there is employed an apparatus that is constructed so that a solvent in which the phosphor particles supplied through the first flow path are dispersed and the etching solution supplied through the second flow path are simultaneously discharged directly into the inside of liquid.

The invention described in Structure 7 makes it possible to mix more uniformly a solvent wherein phosphor particles are dispersed and an etching solution and thereby to obtain more preferable effects, by changing a form of the apparatus to be used, because there is employed an apparatus that is constructed so that at least a solvent in which the phosphor particles supplied through the first flow path are dispersed and the etching solution supplied through the second flow path are caused to collide with each other and are mixed, and then, are continuously supplied to the third flow path, and the solutions after the collision and mixing are supplied at a speed of flow that is higher than that of the solvent in which the phosphor particles are dispersed and that of the etching solution, and then, are continuously discharged from the third flow path.

The invention described in Structure 8 makes it possible to remove simultaneously impurities such as nonreacted substances and by-products adhering to the surface of phosphor particle and a surface layer damaged in the course of a crushing treatment process, and thereby to reduce the number of processing steps and to lighten burdens for workers, because the step of surface treatment is carried out, following the step of crushing treatment.

The invention described in Structure 9 makes it possible to prevent damage of a phosphor main body caused by an etching solution and thereby to improve light-emission intensity of the phosphor, because the phosphor is manufactured by the method described in any one of Structures 1-8.

The invention described in Structure 10 makes it possible to improve light-emission intensity of a discharge cell and thereby to improve light-emission intensity of PDP, because phosphors described in Structure 9 are contained in a phosphor layer of a discharge cell.

What is claimed is:

1. A method for manufacturing a vacuum ultraviolet exciting phosphor, comprising:
    (a) crushing phosphor particles via a crushing treatment process, and
    (b) subsequently surface-treating said phosphor particles by dispersing said phosphor particles in a solvent, and adding an etching solution via a surface treatment process, wherein said etching solution is added at a rate ranging from $1.2\times10^{-16}$ to $7.0\times10^{-15}$ mol/min. per 1 m$^2$ of specific surface area of said phosphor particles.

2. The method of claim 1, wherein said etching solution is added in an amount ranging from 0.001 to 0.005 mol per 1 g of said phosphor particles.

3. The method of claim 1, wherein a temperature during addition of the etching solution is in a range of 20-60° C.

4. The method of claim 1, further comprising, after the surface treatment, (c) a washing process, and (d) a drying process.

5. The method of claim 1, wherein:
    an apparatus is employed, said apparatus comprising a first flow path, a second flow path, and a reaction vessel containing a liquid having a surface,
    wherein said phosphor particles dispersed in a solvent are supplied via said first flow path, and said etching solution is supplied via said second flow path, and
    said first and second flow paths are configured such that said phosphor particles dispersed in a solvent and said etching solution are discharged below the surface of said liquid.

6. The method of claim 1, wherein:
    an apparatus is employed, said apparatus comprising a first flow path, a second flow path, and a third flow path, said first flow path supplying said phosphor particles dispersed in a solvent, said second flow path supplying said etching solution;
    said first and second flow paths being configured so as to bring together said phosphor particles dispersed in a solvent and said etching solution to form a mixture, said mixture being continuously supplied to said third flow path;
    said mixture is supplied at a flow speed that is faster than the flow speed of said phosphor particles dispersed in a solvent, and of said etching solution; and
    continuously discharging said mixture from said third flow path.

* * * * *